(12) United States Patent
Mantini et al.

(10) Patent No.: US 6,921,100 B2
(45) Date of Patent: Jul. 26, 2005

(54) AXLE WEIGHT DISTRIBUTION SYSTEM

(75) Inventors: John Mantini, Niagara-on-the-Lake (CA); Dimitre Iankoulov, Niagara Falls (CA)

(73) Assignee: Wheel Monitor Inc., Niagara-On-The-Lake (CA)

( * ) Notice: Subject to any disclaimer, the term of this patent is extended or adjusted under 35 U.S.C. 154(b) by 0 days.

(21) Appl. No.: 10/331,392

(22) Filed: Dec. 30, 2002

(65) Prior Publication Data

US 2003/0155164 A1 Aug. 21, 2003

(51) Int. Cl.[7] .............................................. B62D 53/06
(52) U.S. Cl. ................ 280/407; 280/407.1; 280/149.2; 177/137; 180/24.02; 340/431; 340/440
(58) Field of Search .............................. 280/406.1, 407, 280/407.1, 149.2, 6.159; 180/24.02, 209; 340/438, 440, 431; 701/36, 37, 124; 177/137

(56) References Cited

U.S. PATENT DOCUMENTS

| | | | | |
|---|---|---|---|---|
| 4,353,565 A | * | 10/1982 | Smith et al. | 280/149.2 |
| 5,167,289 A | * | 12/1992 | Stevenson | 177/141 |
| 5,476,277 A | * | 12/1995 | Schueman | 280/407.1 |
| 5,780,782 A | * | 7/1998 | O'Dea | 177/137 |
| 5,863,057 A | * | 1/1999 | Wessels | 280/407.1 |
| 6,203,045 B1 | * | 3/2001 | Kyrtsos et al. | 280/405.1 |

* cited by examiner

Primary Examiner—Peter C. English
(74) Attorney, Agent, or Firm—Volpe and Koenig, P.C.

(57) ABSTRACT

The present invention relates to a system for adjusting weight distribution throughout all axle groups of the truck and trailer. The trailer has at least one axle group mounted on a pair of rails attached to the frame of the trailer. These axle groups are locked in position on the rails by locking pins. The system for adjusting weight distribution according to the present invention measures the weight on every axle group on the truck and trailer. The measurement may be of weight directly by load cells etc. or indirectly, by taking measurements from the air suspension system to calculate weight. The measurements are delivered as an electrical signal to one or more microprocessors capable of receiving the electrical signals and calculating the optimum position of the axle group on the trailer. The position of the trailer axle groups relative to the rails is also determined and the position delivered to the microprocessor(s). The microprocessor(s) is programmed to calculate the weight on each axle group and determine any change in position of the trailer axle group(s) on the rails to optimize the weight distribution. The information is presented to the driver on a display located in the cab of the truck. The system further includes apparatus to lock and unlock the locking pins that lock the trailer axle group(s) in position on the rails. The system also includes a communication interface between the truck and the trailer.

8 Claims, 6 Drawing Sheets

AXLE WEIGHT DISTRIBUTION SYSTEM

BACKGROUND OF THE INVENTION

1. Field of the Invention

This invention relates to tractor and trailer combinations in heavy trucks. In particular the present invention provides a system for adjusting weight distribution throughout all axle groups of the truck and trailer.

2. Description of the Prior Art

The weight of a vehicle is of crucial importance in the trucking industry. The cost of delivering a load for commercial purposes is often assessed to the customer according to the weight of the load and the distance it must travel. Knowledge of load weight is therefore necessary to ensure that the customer is assessed the full price of transporting the load. Weight information can also be used to optimize the load at or near the vehicle's maximum capacity.

The weight of commercial trucks is also important from the perspective of public safety and highway maintenance. Overloading a commercial vehicle can create a hazard by reducing the truck's stability and braking ability. An overloaded commercial vehicle also causes significantly greater wear to public highways and to the vehicle itself. Governments therefore regulate vehicle weight by specifying a maximum legal load limit and fining vehicle operators for any overage.

Governments also regulate the weight of every axle group of a truck and/or trailer over the pavement. The axle groups on the trailer typically include one or more mounted on a suspension slider so they can be moved back and forth. By moving the suspension slider back and forth the cargo weight can be distributed between the axle group(s) on the trailer and the tractor so no one axle will be over the limit. When the trailer suspension slider is moved forward (closer to the truck) the weight is shifted from the tractor to the trailer (the trailer axle load weight becomes heavier and the tractor axle weight becomes lighter). When the trailer suspension is moved backward (away from the truck) the weight is shifted from the trailer to the tractor (the trailer axle load weight becomes lighter and the tractor axle weight becomes heavier). Very often the operator has to move the suspension back and forth to evenly distribute the weight to meet the compliance of the maximum axle load weight.

Moving the suspension slider for the axle group back and forth is not an easy or pleasant task and typically involves following several steps and considerable time. First the operator parks the tractor and trailer. Then he/she goes to the back of the trailer suspension and releases the lock/latch pins. Sometimes these pins are bound by the weight of the suspension and are difficult to release manually. This may require the driver to have to rock the trailer to disengage. The driver must then go back into the cab, move the tractor forward or backward so the suspension slider on the trailer is in the desired position. The operator then attempts to re-lock the pins, which could again require rocking the tractor to re-lock the pins. After the desired position of the suspension is attained, the driver must go back, physically lock the pins and visually inspect the suspension.

Without any means to measure or determine the weight on the axle groups, the position of the slider is chosen from guidelines and the driver's experience based on the load and the positioning of the load. Sometimes the judgment of the driver may prove to be incorrect which could result in overweight of one axle group over another.

Efforts to provide a solution to the problem have resulted in all or some of the functions done independently from each other for the purpose of displaying the axle group weight or calculating the Gross Vehicle Weight (GVW). Given the axle group weight, the driver can manually adjust the suspension between the truck and trailer.

One of the biggest problems with existing systems is the limitation of the response time of the air suspension systems. The known weight systems have employed various devices for sensing the weight of the vehicle including load cells, string gages, displacement transducer and so on. Most widely used are systems based on the measurement of the pressure in the air bag on the axle suspension and mathematical functions that can be done to convert to a weight. The problem is that there is often a relatively long period of time needed for the air bag to balance itself when the load is changed. When the weight is taken away, the air leveler in the air bag needs to release some air for the new weight and that process can take 2–3 minutes depending upon the amount of air pressure needed to be released. When weight is added, the pressure on the air bag needs to increase so the level mechanism can add air. After balancing, the air is cut off and then an accurate measurement of the pressure can be taken. The time required for the measurement of the weight on the air suspension can make the adjustment of the axle group or fifth wheel connection a long process because after every movement of the slider for the axle group or fifth wheel connection, the operator needs to wait a period of time (time for the air in the airbag to be balanced) and then measurement can take place.

SUMMARY OF THE INVENTION

It is an object of the invention to provide a system for adjusting weight distribution throughout all axle groups of the truck and trailer including determining the weight on every axle group.

It is further object of the invention to provide a system for adjusting weight distribution throughout all axle groups of the truck and trailer including a communications interface between the truck and trailer.

It is a further object of the invention to provide a system for adjusting weight distribution throughout all axle groups of the truck and trailer including a control keypad/display unit with a display visualized in an easy to read graphic format of different weight levels of the axles.

It is a further object of the invention to provide a system for adjusting weight distribution throughout all axle groups of the truck and trailer including locking and unlocking mechanisms for the suspension slider.

Moving an axle group on the trailer or the fifth wheel connection closer or further to/from the tractor can result in the changing of the distribution of the axle weight. Automating the process can result in time saving and improve driver safety.

To overcome the shortfalls of known weighing systems and to make the process of adjusting the weight more desirable and accurate, the present invention provides a system for adjusting weight distribution throughout all axle groups of the truck and trailer. The trailer may have one or more axle groups mounted on a pair of rails attached to the frame of the trailer. The axle groups are locked in position on the rails by locking pins. The system for adjusting weight distribution according to the present invention comprises means for measuring the weight on every axle group on the truck and trailer. The measurement may be of weight directly, where the means for measuring weight consists of load cells etc. or indirectly, where the means for measuring weight takes measurements from the air suspension system to calculate weight. The measurements are delivered as an electrical signal to one or more microprocessors capable of receiving said electrical signals and calculating the optimum position of the axle groups on said trailer. Means are provided in association with the trailer axle groups to detect the position of said axle group(s) relative to said rails. The position of said trailer axle groups is also delivered to the microprocessor(s). The microprocessor(s) is programmed to calculate the current weight on each axle group and determine any change in position of the trailer axle group(s) on the rails to optimize the weight distribution. The information is presented to the driver on a display means located in the cab of the truck. The system further includes means to lock and unlock the locking pins that lock the trailer axle group(s) in position on the rails. The system also preferably includes means for providing a communication interface between the truck and the trailer.

In a further embodiment the system may be applied to a truck having a fifth wheel connection for the trailer where the fifth wheel connection is mounted on a pair of rails attached to the frame of the truck. The fifth wheel connection is locked in position on the rails by a locking pin(s). In this situation, the system for adjusting weight distribution additionally includes means to detect the position of the fifth wheel connection relative to the rails. The position of the fifth wheel connection is also delivered to the microprocessor(s). The microprocessor(s) is programmed to determine any change in position of the trailer axle group(s) and the fifth wheel connection on the rails to optimize the weight distribution. The information is presented to the driver on a display means located in the cab of the truck. The system further includes means to lock and unlock the locking pins that fix the position of the fifth wheel connection on the rails.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
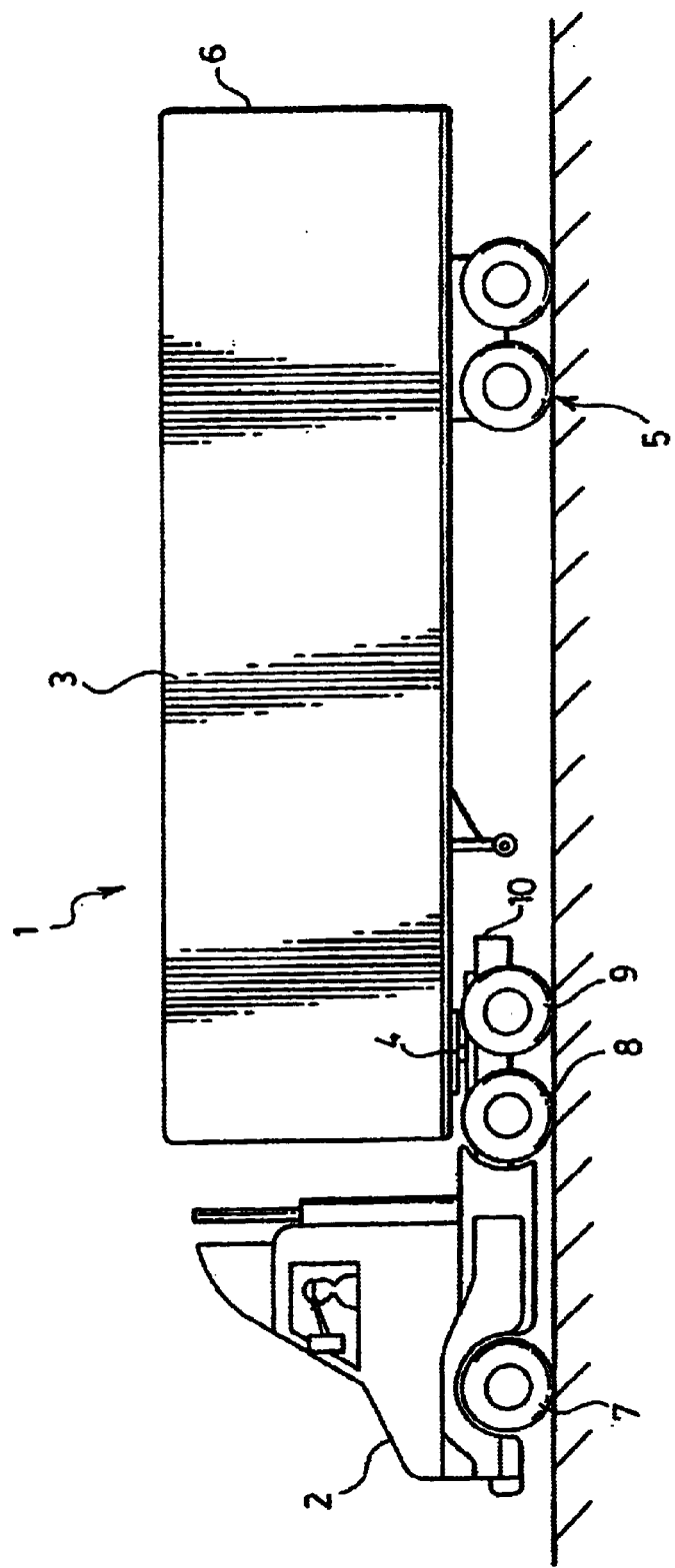
FIG. 1 is a side view of a truck and trailer of the type on which a system for adjusting weight distribution throughout all axle groups according to the present invention can be installed.
Figure 2:
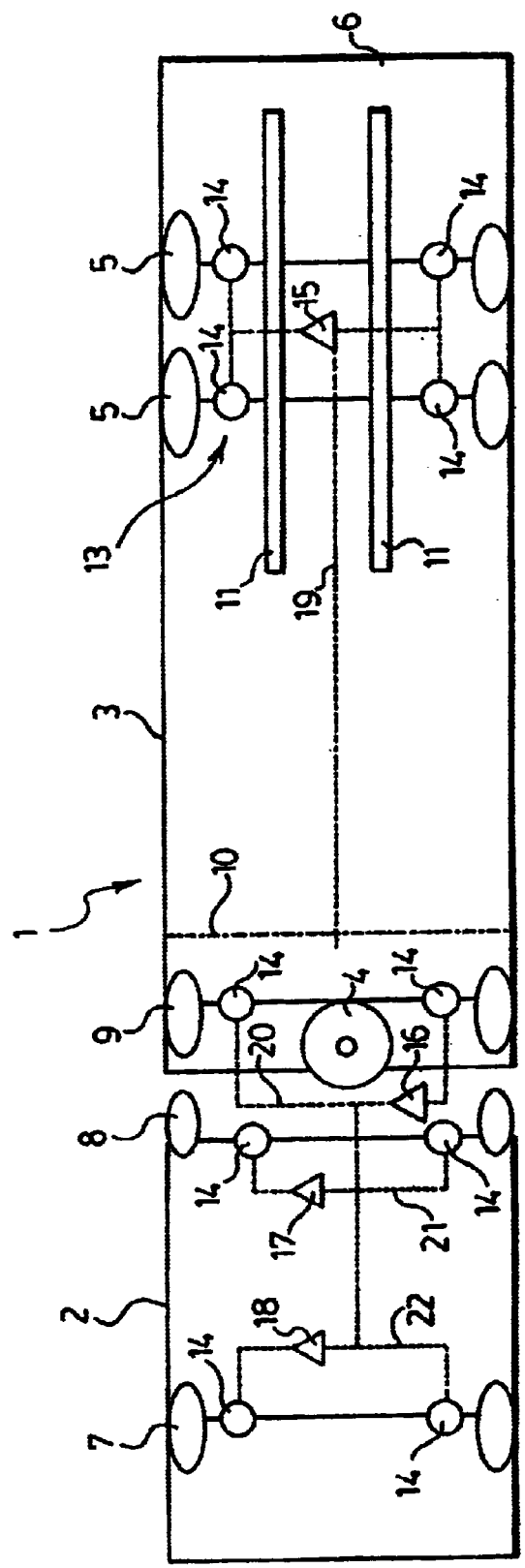
FIG. 2 is a schematic bottom plan view of the truck and trailer of FIG. 1 showing the axle groups.

Referring to FIGS. 1 and 2, a truck and trailer combination of the type on which a system for adjusting weight distribution throughout all axle groups according to the present invention can be installed, is generally indicated at 1. The truck or tractor 2 has a trailer 3 attached to the tractor 2 by a conventional fifth wheel connection 4 or the like. The rear axles 5 on trailer 3 are shown as a tandem axle arrangement. Other arrangements and numbers of axle groups however can be utilized in accordance with the present invention as long as at least one axle group is adjustable forward or back. The rear axles 5 on trailer 3 can be adjusted forward and back relative to the rear 6 of trailer 3. The front and rear axles 7,8,9 of tractor 2 are fixed. However the fifth wheel connection 4 at the rear 10 of truck 2 can also typically be adjusted forward and back.

By moving the rear axles 5 and/or fifth wheel connection 4 back and forth the cargo weight can be distributed between the rear axle group 5 of the trailer and the rear axles 8,9 of the tractor so no one axle will be over the prescribed weight limit. When the rear axles 5 on the trailer 3 are moved forward (closer to the truck) the weight is shifted from the tractor 2 to the trailer 3 (the trailer axle load weight becomes heavier and the tractor axle weight becomes lighter). When the rear axle 5 of trailer 3 are moved backward (away from the truck) the weight is shifted from the trailer to the tractor (the trailer axle load weight becomes lighter and the tractor axle weight becomes heavier). Similarly when the fifth wheel connection 4 is moved forward the weight is shifted from the tractor 2 to the trailer 3 (the trailer axle load weight becomes heavier and the tractor axle weight becomes lighter). When the fifth wheel connection 4 is moved backward the weight is shifted from the trailer to the tractor (the trailer axle load weight becomes lighter and the tractor axle weight becomes heavier).

Moving the rear axle group and/or fifth wheel connection back and forth in accordance with common conventions is not an easy or pleasant task and typically involves the following several steps and considerable time. First the operator parks the tractor and trailer. Then the driver goes to the back of the trailer suspension and releases the lock/latch pins. Sometimes these pins are bound by the weight of the suspension and are difficult to release manually. This may require the driver to have to rock the trailer to disengage. The driver must then go back into the cab, move the tractor forward or backward so the suspension slider on the trailer is in the desired position. The operator then attempts to re-lock the pins, which could again require rocking the tractor to re-lock the pins. After the desired position of the suspension is attained, the driver must go back, physically lock the pins and visually inspect the suspension.

To overcome these shortfalls of known weighing systems and to make the process of adjusting the weight more desirable and accurate, the present invention provides a system for adjusting weight distribution throughout all axle groups of the truck and trailer. The trailer 3 has one or more axle groups 5 mounted on a pair of rails 11 attached to the frame 12 of the trailer 3. The axle group 5 are locked in position on the rails 11 by locking pins (see FIG. 3). The system for adjusting weight distribution according to the present invention includes means, generally indicated at 13, for measuring the weight on every axle group on the truck and trailer. The measurement may be of weight directly where the means 13 consists of load cells or indirectly where measurements from the air suspension system are utilized. FIGS. 2–5 illustrate schematically the electrical and pneumatic components of one embodiment of a system for adjusting weight distribution throughout all axle groups according to the present invention. The system 1 is illustrated in association with an air suspension system on the tractor/trailer combination. Air bags 14 are located at each end of axles 5, 7,8 and 9. A series of pressure sensors 15, 16, 17, 18, associated with the supply line 19, 20,21, 22 for each air bag 14, measure the pressure in supply lines 19–22.

The measurements are delivered as an electrical signal to one or more microprocessors capable of receiving said electrical signals and calculating the optimum position of the axle groups on said trailer. In the embodiment shown, the pressure sensor 15 on the trailer converts the pressure measurement into an electrical signal that is transmitted to a microprocessor 23 that in the preferred embodiment is contained within electronic control unit (ECU) 25. The ECU 25 on the trailer includes transmitter and receiver means 26 for sending and receiving signals from a corresponding EDU 27 on the tractor in which microprocessor 24 is contained. The ECU 25 further controls the sensor conditioning and protection circuitry 28 associated with the pressure sensors 15. Similarly, the pressure sensors 16, 17, 18 on the tractor convert the pressure measurements into an electrical signal that is sent to microprocessor 24 contained within ECU 27. In the embodiment shown in FIG. 5, a three way level value 29 is provided on each supply line 19–22 to level the load between ends of an axle group. The microprocessor 23 on the trailer and the microprocessor 24 on the tractor are programmed to take the electric signal from each pressure sensor 15, 16, 17, 18 and by a series of calculations determined the weight on each axle group. The information is presented to the driver on a display means 30 associated with ECU 27 located in the cab of the truck 2. The information can be displayed in any number of ways, but preferably is displayed in easy to read graphic format on display means 30. Before using the system 1, the system must be calibrated for the truck and trailer combination on which the system is installed. Calibration procedures are very important tasks for installation of the system and they have to be described and completed properly. If the system is reinstalled to another vehicle a calibration of the system needs to be completed. A keypad 31 is provided with the display means 30 to assist with calibration of the system.

The system for adjusting weight distribution throughout all axle groups according to the present invention, preferably includes means, generally indicated at 32, to detect the position of the trailer axle groups. In the embodiment shown, the means 32 to detect the position of said axle group(s) relative to said rails, is position sensors 33 that detect the position of the axle group relative to the rails 11 and communicate that information to the ECU 25. The position sensors 33 could be based on various sensing techniques including a proximity sensor, Hall effect sensors, contact or non-contact limited switches, and other sensors suitable for the type of environment presented by use under a truck or trailer. The ECU 25 delivers the weight on the trailer axle group(s) 5 and the position of the axle group(s) 5 relative to rails 11 to the microprocessor 24 in the cab. The microprocessor 24 is programmed to determine any change in position of the trailer axle group(s) on the rails to optimize the weight distribution.

Figure 3:
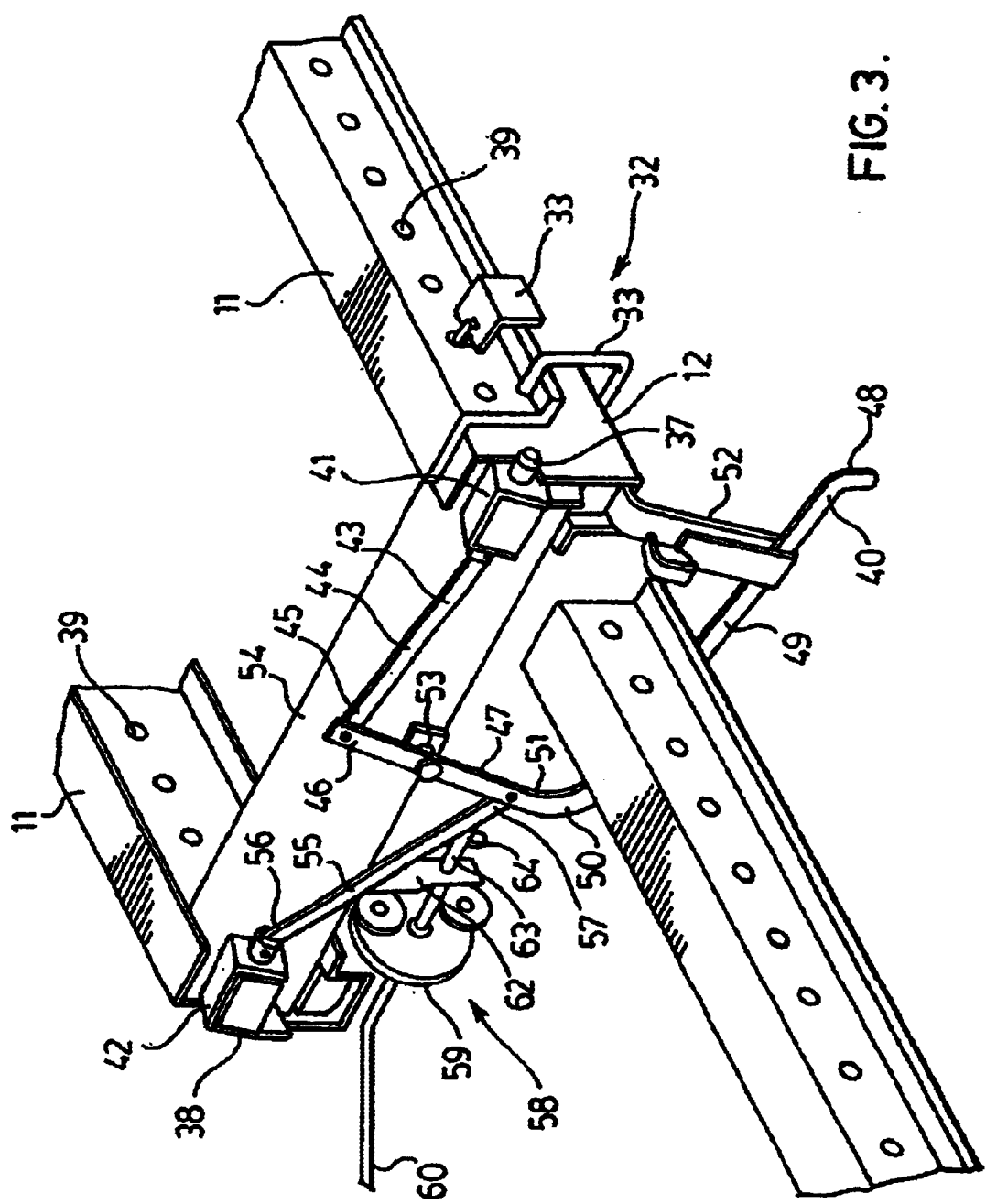
FIG. 3 is a perspective view of one embodiment of means to lock and unlock the locking pin that fix the trailer axle groups position according to the present invention.
Figure 4:
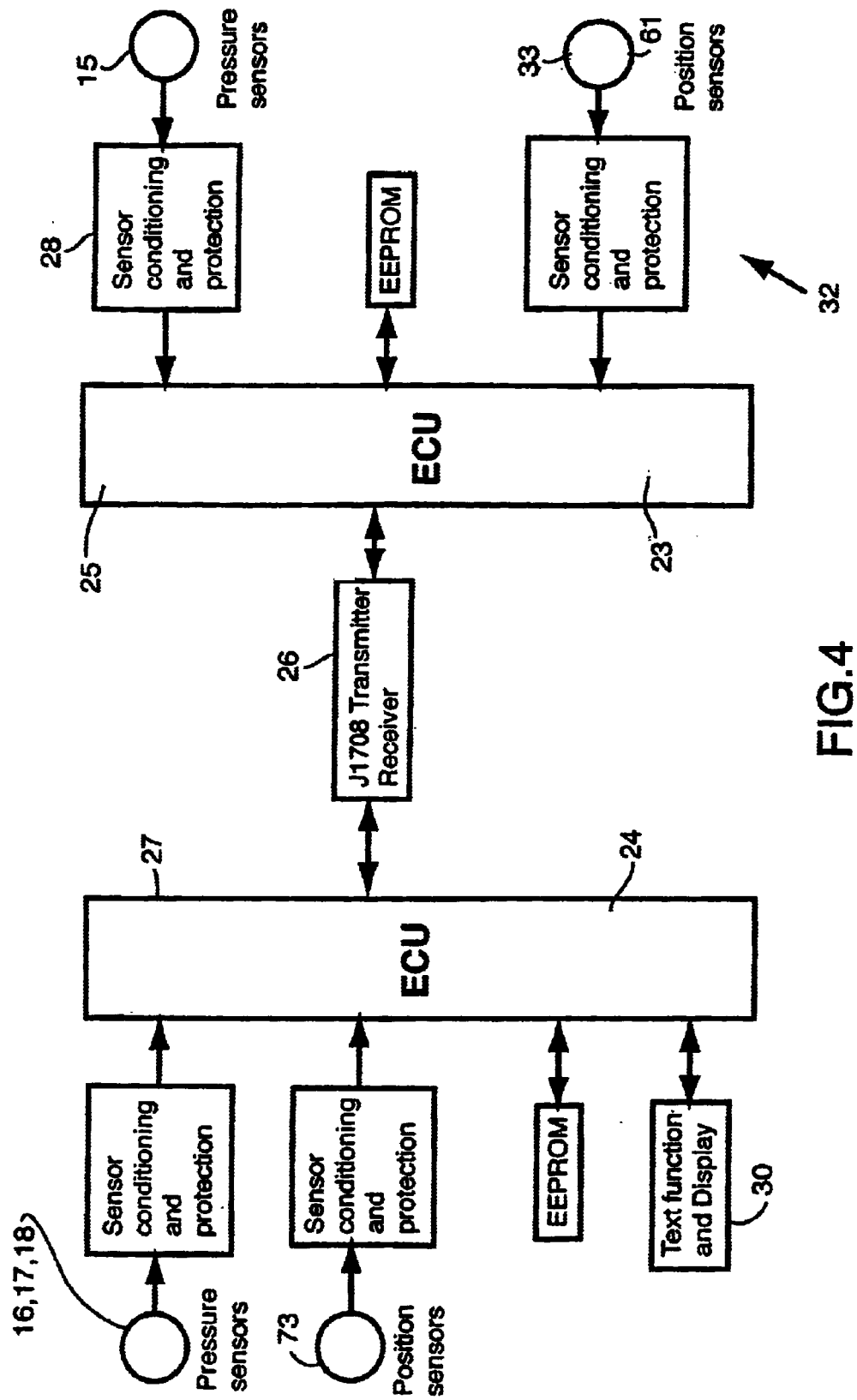
FIG. 4 is a block diagram of an electronic control unit for the system for adjusting weight distribution throughout all axle groups of the truck and trailer.
Figure 5:
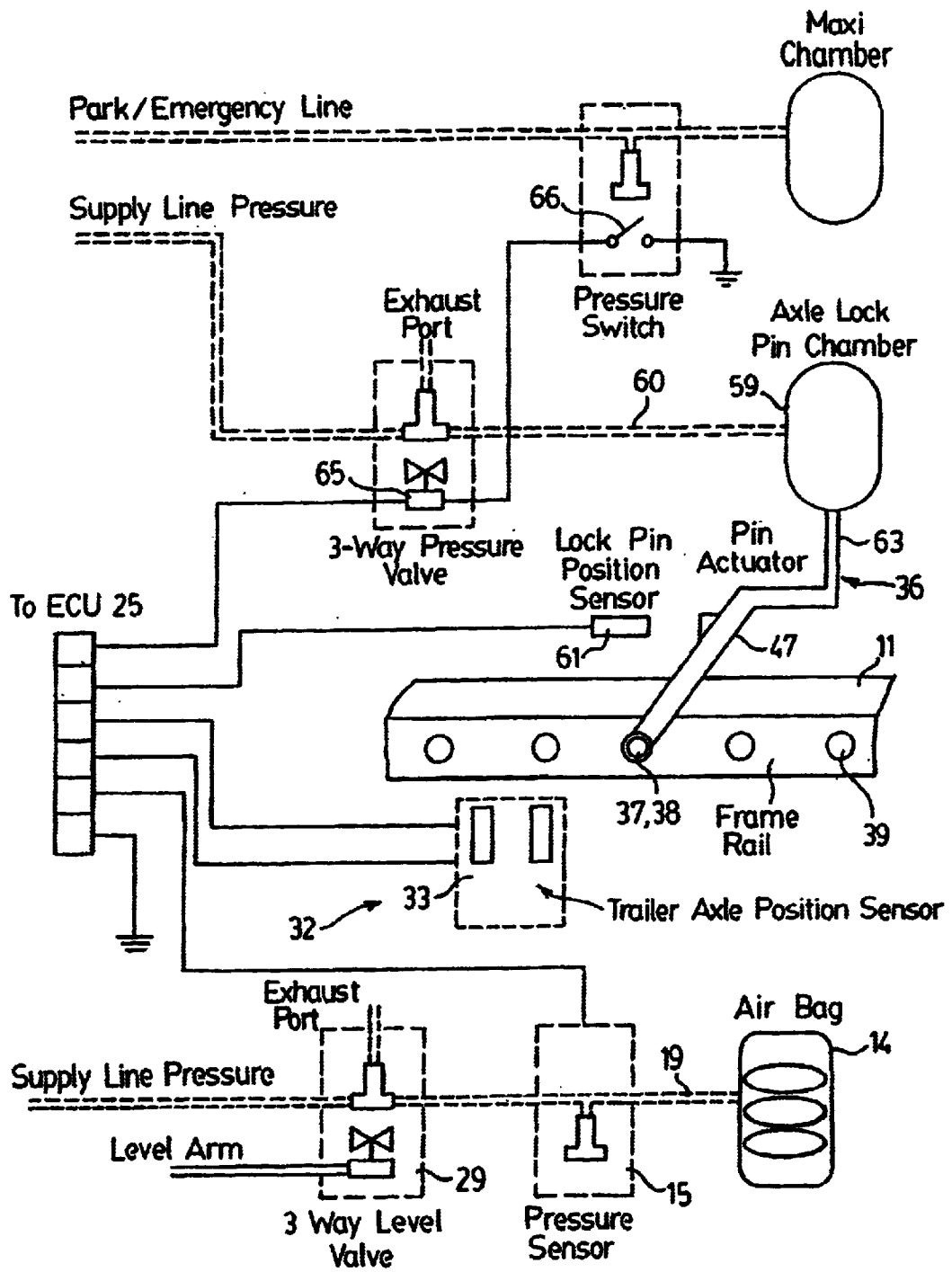
FIG. 5 is a schematic diagram of a means for measuring weight and means for determining the position of the axle groups of the truck and trailer.

The system 1 further includes means, generally indicated at 36, to lock and unlock the locking pins that fix the position of the trailer axle group(s) on the rails (see FIG. 3). As noted earlier, the rear axles 5 are mounted on a pair of rails 11. Locking pins 37,38 on each side of the axle group are adapted to fit into one of a series of holes 39 on rails 11 to fix the rear axle 5 in position. In known systems, the pins 37,38 are typically released or locked by means of handle 40. The locking pins 37,38 are conventionally mounted in a housing or bracket 41,42 to permit the locking pin 37,38 to be manually moved in and out (forward/backward) relative to holes 39 on rails 11. The rear of pin 37 is connected to one end 43 of a first link strap 44. The other end 45 of strap 44 is pivotally connected to the distal end 46 of locking bar 47. The locking bar 47 in the embodiment illustrated has a first end 48, which acts as a handle 40. A first straight section 49 extends from the first end 48 to a curve 50. A second straight section 51 extends from the curve 50 to distal end 46. The locking bar 47 is mounted to an axle group support frame member 12 by means of mounting plate 52 that supports the first straight section 49 and handle 40. A pivot connection 53 along the second straight section 51 connects it to an axle group support frame member 54. A second link strap 55 has one end 56 connected to the end of locking pin 38. The other end 57 of link strap 55 is pivotally connected to the second straight section 51 of the locking bar 47 at a point located between the pivot connection 53 and curve 50. Pushing handle 40 towards the trailer frame causes pins 37, 38 to slide into holes 39 on rails 11. Pulling the handle 40 away from said trailer frame causes pins 37,38 to move out of holes 39 on rail 11 unlocking the axle group. The locking pins 37,38 are spring biased in the locked position.

The present invention includes means, generally indicated at 58, for locking and unlocking each locking pin 37,38. In the embodiment shown, the means 58 for locking and unlocking pins 37,38 includes an air chamber 59 having an air supply line 60. One or more pin position sensors 61 are located in association with locking pins 37,38 to determine if they are in the locked or unlocked position. The sensors 61 could be based on various sensing techniques which could include a proximity sensor, Hall effect sensors, contact or non-contact limited switches, and other sensors suitable for that type of environment and physical dimension of the locking pins 37,38. The position sensors 61 send an electrical signal to the ECU 25 on the trailer which is then transmitted to the ECU 27 on the tractor. The air chamber 59 is attached to the axle group support frame, in the embodiment illustrated, by bracket 62. A piston rod 63 is controlled by air chamber 59. The distal end 64 of piston rod 63 is attached directly or indirectly (as shown in FIG. 3) to the second straight section 51 of locking bar 47. When the air chamber 59 causes piston rod 63 to extend to its maximum position, it pushes locking bar 47 causing locking pins 37,38 to be retracted (unlocked). When the pressure in air chamber 59 is released, piston rod 63 retracts, pulling on locking bar 47 and causing pins 37, 38 to move into the holes 39 on rails 11. The EUC 25 controls the air pressure to air chamber 59 by means of 3-way pressure valve 65 or the like.

It is important that the suspension is not unlocked unless the vehicle is in parked mode. One method of accomplishing this is to wire the 3-way pressure valve 65 in series with a switch which would detect the pressure of the emergency (parking) brakes. In the embodiment illustrated in FIG. 5 a pressure switch 66 in association with the park/emergency brake, prevents unlocking of the pins 37,38 unless the vehicle is in park or the emergency brake on. When the emergency (parking) brakes are applied, pressure is released, then the 3-way pressure valve 65 is allowed to operate to deliver air to the air chamber 59 which consequentially allows the locking pins 37,38 to be unlocked. This will insure that the driver cannot accidentally unlock the locking pins 37,38. The air chamber 59 used in this application to unlock the pins 37,38 preferably has a built in coil spring with approximately 2000 lbs of applicable force to bias the rod 63 and insure that the pins 37,38 will not unlock accidentally.

Moving the rear axle group and/or fifth wheel connection back and forth according to the present invention typically involves the following steps. First the operator parks the tractor and trailer. Feedback from position sensors 61 on the status of the pins 37, 38 can be displayed on the display in the cab thereby eliminating the need for the driver to go back to the trailer to inspect the pins' position for lock/unlock. However after the axle group(s) are moved and locked, the driver should visually inspect the pin 37,38 position and the position of the axle group(s) 5.

The driver uses the system to determine the weight on each axle group as determined by pressure sensors 15,16, 17,18 as communicated to ECUs 25,27. Position sensors 33 determine the location of the axle group(s) 5. The ECU 27 is programmed to take this information and determine the optimum location of the axle group(s) and determines if the rear axle 5 on trailer 3 needs to be moved forward or back and how far. The system 1 includes a display 30 in tractor 2 that advises the operator of the location of the axle group(s) and what changes are required to optimize the load weight on the axle group(s). With the brakes on the rear axle group 5 engaged, the driver releases the lock/latch pins 37,38 on the rear axle group 5. The driver then moves the tractor 2 forward or backward so the rear axle group 5 on the trailer 3 is in the desired position. The driver then re-locks the pins 37,38 on rear axle group 5, which may require rocking the tractor 2 to re-lock the pins 37,38 into holes 39 on rails 11. The procedure may be repeated with the fifth wheel connection 4 in order to optimize the weight on all axle groups. After the desired position of the rear axle group 5 and fifth wheel connection 4 are attained, the driver must confirm the optimization of the weight on all axle groups.

In prior art systems, particularly in air suspension systems, a relatively long period of time is needed for the air bag to balance itself when the load is changed. When weight is taken away, the air leveler in the air bag needs to release some air for the new weight and that process can take 2–3 minutes depending upon the amount of air pressure needed. When weight is added the pressure on the air bag needs to increase so the level mechanism can add air. After balancing, the air is cut off and measurement of the pressure can then be accurately made. The time of the measurement of the weight of the air suspension can make the adjustment of the axle group(s) a long process because after every movement of the axle group, the operator needs to wait a period of time (time for the air in the airbag to be balanced) and then the measurement can take place.

The system for adjusting weight distribution throughout all axle groups according to the present invention decreases the time needed for the adjustment. One of the means for decreasing the time needed for adjustment is based on the fact that increasing pressure in the airbag is less time demanding than decreasing pressure on the airbag. In other words, increasing the weight on the axle group is faster to measure than decreasing the weight on the axle group. Based on the fact that moving the rear axle group or fifth wheel connection, the weight is shifted from one group to another group, it has been determined that the system should determine and measure, in the confirmation step after adjustment, just the weight on the axle group that has had the weight increased (which is faster). The system is programmed to calculate the changes of the axle group on which the weight is decreased based on a mathematical model depending on the number of axles and the configuration of the vehicle. By measuring just the weight on the increasing axle group, the response time needed for the adjustment is reduced a great deal. By using this method, the rear axle group and/or fifth wheel connection can be rapidly adjusted to optimize the weight distribution.

The mathematical formula for the process is as follows:

$$GVW = WAG1 + WAG2 + WAG3 + \ldots WAGn$$

where GVW=Gross Vehicle Weight, WAG1=Weight of axle group 1, WAG2=weight of axle group 2, WAG3=weight of axle group 3 . . . etc. After the rear axle or fifth wheel connection is moved the changes in the weight on the axle groups can be expressed that is as follows:

$$GVW = \Delta WAG1 \pm \Delta WAG2 \pm \Delta WAG3 \pm \ldots \Delta WAGn + WAGn + WAG1 + WAG2 + WAG3 + \ldots WAGn$$

$\Delta WAG1$=changes of the weight of the axle group 1, $\Delta WAG2$=changes of the weight of the axle group 2 etc. The change in weight−or+(minus or plus) depends if the changes of the weight on the axle group are decreased or increased.

$$\Delta WAG1 + \Delta WAG2 + \Delta WAG3 + \ldots \Delta WAGn = 0$$

The sum of the all changes of the axle groups is equal to zero. Measuring the weight of axle groups where the weight is increased can be done quickly, and then the system calculates the weight of the axle groups where the weight is decreased. By using a combination of measurements and calculations when the trailer is moved back and forth relative to the axle groups, the system can enhance and decrease the time needed and can result in increased performance of weight adjustments.

The second method for decreasing the response time of the measurement of the axle group when the suspension is moved is based on the measurement of the length and the direction of the movement. Measuring the length and direction of the movement of the rear axle group(s) can be used to determine a percentage of the weight that has been shifted to/from the trailer and measurement of the lengths and direction of the movements is a very fast process and the driver doesn't need to wait for the balancing of the air suspension. The measurement of the movement and the direction of the rear axle group can be achieved by position sensors 33. The position sensors 33 could include displacement transducers which measures the distance of the displacement. The accuracy of displacement is not that critical but reliability is an issue when working in that environment. Using an ultrasonic electronic system to measure the distance of the displacement of the rear axle group(s) 5, can be very reliable in the environment under the trailer. Non-contacted proximity sensors installed on the frame of the trailer and calculating the distance by the number of the holes of the rails and the base of the distance by the holes the total displacement can be measured. The direction of the movement forward and backward can be done by using two sensors and by analyzing the state of the sensors on or off, the direction of the movement can be sensed.

Based on the distance and the direction of the movement, the system of the present invention can calculate the changes in the weight faster than any other method. Calculation and the relationship between the distance of the movement and the percentage of the load shifting depends on quite a few factors including:

Mechanical construction of the trailer and the suspensions
1. Number and positioning of the axle groups
2. Length and distance to the trailer axle slider
3. The distance or spread between the axle groups and some other factors including the weight distribution.

The relationship of the distance and the percentage of the load shifting is storing in a non-volatile memory in the microprocessor 24 and is relevant to a particular vehicle. The percentage of the ratio is calculated and stored on installation procedures and is specific for the type of the trailer configuration. By measuring the movement of the rear axle group(s) 5 and calculating the percentage of the weight shifting between the axle groups, less time is required than in known systems. However the driver must wait until the balancing of the air suspension bags are done.

Figure 6:
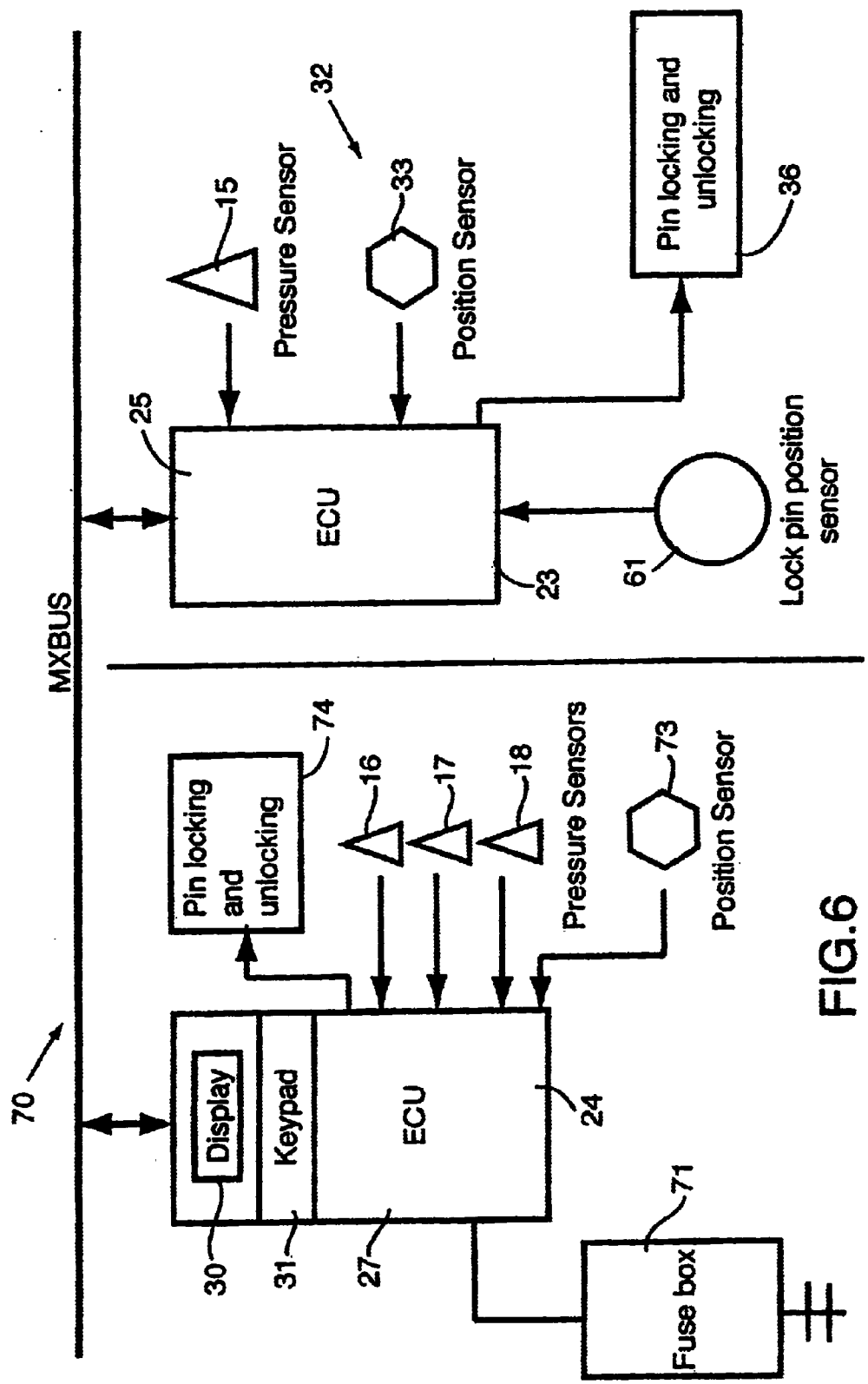
FIG. 6 is a block diagram of one embodiment of a communication interface between the truck and trailer.

The system also includes means for providing a communication interface between the truck and trailer. One embodiment of communications interface, generally indicated at 70, is schematically illustrated in FIG. 6. The system 1 can be powered as an auxiliary on the fuse box 71 and draws from the vehicle's electrical power supply system. A back up system can be provided such as a rechargeable battery etc. By utilizing digital programmable microprocessors 23,24 the system can be capable of storing in memory the data from the pressure sensors 15,16,17,18, position sensors 33 and 61. Further a digital key pad 31 can be provided to enable the operator to isolate specific sensors and/or perform other functions if required.

The ECU's 25 and 27 can communicate with each other by a variety of known means. The EUC's could be connected by wire or co-axial cable, however authorities are discouraging additional wire connections between the cab and trailer and restricting wire or cable to the current seven prong connection. Radio receivers and transmitters or cellular connections could be utilized however a reliable, secure interface without the possibility of outside interference or disruption is required.

In the preferred embodiment the ECUs, 25 and 27, communicate with each other on a multiplex bus (MXBUS) that uses a wire connected to one of the pins on the standard seven pin connector between the cab and trailer for transmitting and receiving data. This is accomplished by pulsing a high frequency carrier on the selected wire. Dual frequencies are used, one for receive, one for transmit to allow for full duplex communication on the single wire. In one embodiment a turn signal lamp wire is selected. The frequency carriers are low voltage, and are detectable even if the signal lamp is pulsing and will not interfere with the turn signals. The MXBUS is a three conductor bus, one for signal, one for signal com, one for power. These conductors can be found on all truck harnesses that provide the center power pin for an auxiliary circuit or power for the ABS brakes. Recently an industry standard was developed for use in connection with the ABS warning light. This standard uses the PLC4TRUCKS™ protocol developed using spread spectrum communication on the power line carrier. Other wireless communication systems, such as Bluetooth™ or cellular technology, may also be appropriate. Alternatively a second plug could be provided.

By utilizing a multiplexing connection between the cab and trailer, it is possible to incorporate a number of programmable auxiliary features into the system. In addition the system can be programmed so that the operator can control from the cab: lift axle operation, operate rear door locks, operate emergency stop warning lights on the trailer, operate tail gates, hoppers, valves and chutes, operate back up lights and horn on the trailer. The operator can also from the cab monitor: drive shaft overheating, trailer refrigeration units, load shift or weight of the trailer and the like.

In a further embodiment the system may be applied to a truck having a fifth wheel connection for the trailer where the fifth wheel connection is mounted on a pair of rails attached to the frame of the truck. The fifth wheel connection is locked in position on the rails by locking pins similar to the system used on the trailer for the rear axle groups described above. In this situation, the system for automatically adjusting weight distribution additionally includes means to detect the position of the fifth wheel connection relative to the rails. The means to detect the position of the fifth wheel connection relative to said rails, is position sensors 73 that detect the position of the fifth wheel connection relative to the rails and communicate that information to the ECU in the cab. The position sensors could be based on various sensing techniques which could include a proximity sensor, Hall effect sensors, contact or non-contact limited switches, and other sensors suitable for that type of environment. The position of the fifth wheel connection is delivered to the microprocessor 24 in the cab. The microprocessor 24 is programmed to determine any change in position of the trailer axle group(s) and the fifth wheel connection on the rails to optimize the weight distribution. The information is presented to the driver on a display means 30 located in the cab of the truck. It determines if the fifth wheel connection needs to be moved forward of back and how far.

The system further includes means 74 to lock and unlock the locking pins that fix the position of the fifth wheel connection on the rails. A system similar to that shown in FIG. 3 for locking and unlocking the pins to fix the rear axle in position can be used. The means 74 for locking and unlocking pins preferably includes an air chamber having an air supply line. One or more pin position sensors are located in association with locking pins to determine if they are in the locked or unlocked position. The sensors could be based on various sensing techniques which could include a proximity sensor, Hall effect sensors, contact or non-contact limited switches, and other sensors suitable for that type of environment and physical dimension of the locking pins. The position sensors send an electrical signal to the ECU in the cab. The air chamber is attached to the truck frame by a bracket or other suitable connector. A piston rod is controlled by the air chamber. The distal end of the piston rod is attached directly or indirectly to a mechanism attached to the locking pins. When the air chamber causes piston rod to extend to its maximum position, it causes locking pins to be retracted (unlocked). When the pressure in air chamber is released, piston rod retracts, causing pins to move into the holes on rails and lock the fifth wheel connection in place.

Just as for the rear axle groups, it is important that the fifth wheel connection not be unlocked unless the vehicle is in parked mode.

Having illustrated and described a preferred embodiment of the invention and certain possible modifications thereto, it should be apparent to those of ordinary skill in the art that the invention permits of further modification in arrangement and detail. All such modifications are covered by the scope of the invention.

What is claimed is:

1. A system for adjusting weight distribution throughout axle groups of a truck and trailer, said trailer having at least one axle group mounted on a pair of rails attached to a frame of the trailer, said at least one axle group locked in position on the rails by locking pins, wherein the system for adjusting weight distribution comprises means for measuring the weight on every axle group on the truck and trailer, means to deliver the measurements as an electrical signal to one or more microprocessors, means to detect the position of said at least one axle group on the trailer relative to said rails, means to deliver the position of said at least one axle group as an electrical signal to one of said one or more microprocessors, one of said one or more microprocessors programmed to calculate the weight on each axle group and determine a needed change in position of said at least one axle group on the rails to optimize the weight distribution, display means located in a cab of the truck and means to lock and unlock the locking pins that lock said at least one axle group in position on the rails.

2. A system for adjusting weight distribution throughout axle groups of a truck and trailer according to claim 1 wherein said system includes means for providing a communications interface between the truck and the trailer.

3. A system for adjusting weight distribution throughout axle groups of a truck and trailer according to claim 2 wherein said truck and trailer have an air suspension system with air bags located at opposite ends of each axle group and supply lines to said air bags, wherein said means for measuring the weight on every axle group on the truck and trailer comprises a series of pressure sensors associated with the supply line for the air bags to measure the pressure in the supply lines.

4. A system for adjusting weight distribution throughout axle groups of a truck and trailer according to claim 3 wherein the means to detect the position of said at least one axle group relative to said rails consist of position sensors.

5. A system for adjusting weight distribution throughout axle groups of a truck and trailer according to claim 4 wherein said position sensors are selected from the group consisting of proximity sensors, Hall effect sensors and contact or non-contact limit switches.

6. A system for adjusting weight distribution throughout axle groups of a truck and trailer according to claim 5 wherein said means to lock and unlock the locking pins includes an air chamber having a piston rod controlled by said air chamber wherein maximum movement of the piston rod causes the locking pins to be unlocked and when the pressure in the air chamber is released, the piston rod retracts, causing the locking pins to move into holes on the rails.

7. A system for adjusting weight distribution throughout axle groups of a truck and trailer according to claim 6 wherein said means to lock and unlock the locking pins includes one or more pin position sensors located in association with the locking pins to determine if the locking pins are in a locked or unlocked position.

8. A system for adjusting weight distribution throughout axle groups of a truck and trailer according to claim 1 wherein the truck has a fifth wheel connection for the trailer, where the fifth wheel connection is mounted on a pair of rails attached to a frame of the truck and the fifth wheel connection is locked in position on the rails by locking pins wherein said system for adjusting weight distribution additionally includes means to detect the position of the fifth wheel connection relative to the rails, means to deliver said position to one of said one or more microprocessors as an electrical signal and means to lock and unlock the locking pins that fix the position of the fifth wheel connection on the rails.

* * * * *